(12) United States Patent
Novaes

(10) Patent No.: US 7,239,614 B2
(45) Date of Patent: Jul. 3, 2007

(54) METHODS AND APPARATUS FOR THE PROPAGATION OF MULTICAST TRANSMISSIONS IN A COMMUNICATIONS NETWORK

(75) Inventor: Marcos N. Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 09/906,928

(22) Filed: Jul. 16, 2001

(65) Prior Publication Data

US 2003/0021258 A1      Jan. 30, 2003

(51) Int. Cl.
*H04L 12/28* (2006.01)
(52) U.S. Cl. ...................................... 370/256; 370/389
(58) Field of Classification Search ................ 370/256, 370/390, 400, 408, 401, 432; 709/318
See application file for complete search history.

(56) References Cited

U.S. PATENT DOCUMENTS

| | | | | |
|---|---|---|---|---|
| 5,606,669 A | * | 2/1997 | Bertin et al. ................. | 709/223 |
| 5,784,557 A | * | 7/1998 | Oprescu ..................... | 709/220 |
| 6,330,229 B1 | * | 12/2001 | Jain et al. .................... | 370/256 |
| 6,421,570 B1 | * | 7/2002 | McLaughlin et al. .......... | 700/2 |
| 6,839,730 B1 | * | 1/2005 | Ramabhadran ............. | 709/201 |
| 2002/0016867 A1 | * | 2/2002 | Kampe et al. .............. | 709/318 |
| 2003/0235158 A1 | * | 12/2003 | Lee et al. ................... | 370/256 |

* cited by examiner

*Primary Examiner*—Duc Ho
(74) *Attorney, Agent, or Firm*—Ference & Associates LLC

(57) ABSTRACT

Methods and arrangements for facilitating notification among at least two nodes in a distributed network, involving the designation of one of the nodes as a publisher node, the designation of at least one other of the nodes as at least one subscriber node, and the propagation of a transmission from the publisher node to the at least one subscriber node via at least one link. The propagation is undertaken via only one distinct transmission along any single link.

15 Claims, 15 Drawing Sheets

METHODS AND APPARATUS FOR THE PROPAGATION OF MULTICAST TRANSMISSIONS IN A COMMUNICATIONS NETWORK

FIELD OF THE INVENTION

The present invention relates generally to the field of digital communications, and more particularly to packet transmission systems involved in the management of multicast communications to a plurality of users.

BACKGROUND OF THE INVENTION

In the field of communication networks, the term multicast refers to a data package switching technology in which a single data packet is received by a plurality of nodes. This mode of transmission is specially useful when several nodes in the network need to receive data packets which emanate from the same source. The multicast technology reduces the number of separate transmissions and data switching operations which are necessary to deliver a data package to a set of nodes in a communications network. The communications network contains specialized nodes which are called router nodes, or package switching nodes. Such nodes perform the package switching operation which route a given data package along the network towards a specific destination.

The multicast capability of a network is an extension of the point to point transmission infrastructure of the communications network. There are known to exist a number of network communication standards, the most prominent being the Internet Protocol (IP). Other protocols exist which are distinct to IP, such as Asynchronous Transfer Mode (ATM), or are an extension of the IP protocol. Similarly, several multicast protocols exist which implement the multicast capability which are designed for the several point to point transmission mode protocols. The most prominent of such multicast protocols are the implementations of multicast, which are integrated with the basic IP protocol. Some of these implementations have become standards, such as DVMRP and PIM, and yet others remain under discussion, such as MOSPF. (These are all currently existing multicast technologies, as defined by the IETF [Internet Engineering Task Force]. As DVMRP [Distance Vector Multicast routing Protocol] and PIM [Protocol Independent Multicast] are now standard, they are published as Internet Drafts by the IETF. As MOSPF [Multicast Open Shortest Path First Protocol] is still under discussion at the IETF, it is published as an RFC document [i.e., "Request for Comments"]. The references for these protocols are as follows: DVMRP-IETF Internet Draft; MOSPF-IETF RFC 1584; and PIM-IETF Internet Draft.)

Generally, it can be said that all the currently existing multicast protocols have one characteristic in common, which is the fact that they utilize the same addressing scheme as the underlying point to point protocol. This fact limits the addressing capability of the multicast protocol to that of the underlying point to point protocol. For example, this characteristic makes the protocols in question unsuitable in a scenario in which a data source needs to send a data package to a subset of all of its receivers. Since the number of all possible subsets of receivers of data from a given source grows exponentially with the number of receivers, conventional multicast technology tends to be inadequate for a variety of applications requiring a finer addressing capability.

Apart from the fact that each conventional multicast protocol is usually designed as an extension of the underlying point to point protocol, another important aspect of the design of existing multicast technology is that of the design and maintenance of the multicast distribution trees. A multicast distribution tree is a distributed data structure which includes a number of router nodes, a number of source nodes and a number of receiver nodes. Typically, multicast distribution trees are derived from the actual configuration of the routers of the underlying protocol. In most such protocols, two nodes in the distribution tree are only "neighbors" if they are physically connected by a communications link. In some implementations, a facility exits which allows for a human operator to create links in a multicast distribution tree between two nodes which are not physical neighbors. Such links are called multicast tunnels. The utilization of multicast tunnels has become a necessity in several applications in which users are interconnected by a communications network which does not support any form of multicast protocol. This problem is particularly serious at present, because the most widely utilized communication network is the universal Internet, which was originally derived form the DoD (Department of Defense) ARPAnet and now is the most widely used private network, which spans the entire planet and has a number of users approaching one billion.

The Internet presently only supports the IP point-to-point protocol. The Internet has been unable to support the IP multicast standard because of the sheer size of the Internet. In such a scenario, it becomes very hard to deploy a protocol which builds distribution trees efficiently. Even if this problem could be solved in the near future, another problem, the coarseness of the IP multicast addressing scheme, will still be a limitation of the multicast capability. In case the nodes in the interconnecting network do not support a protocol of choice, it will most likely be necessary to utilize protocol tunnels. The manual configuration, i.e., the construction of multicast distribution trees by human operators, becomes impractical in Internet applications.

In view of the foregoing, several needs have been recognized, among which is a need to provide multicast distribution tree technology configured for efficiently and automatically constructing a multicast distribution tree for nodes which are separated by a network which does not support the specific multicast protocol.

SUMMARY OF THE INVENTION

In accordance with a preferred embodiment of the invention that will be illustrated herein, the problem of coarse network addressing is solved through the provision of a method for the distribution of data packets in the network which utilizes an additional data field, called the predicate. This field which is utilized by the nodes which participate in the protocol to construct subgroups for the distribution of the data packets which emanate from a given source. The source is called the publisher node and the receivers of the published information are called the subscriber nodes.

A method in accordance with at least one embodiment of the present invention utilizes a multicast distribution tree, and is based on the detection and exploitation of shared paths in a given distribution tree. Although specific methods for building the multicast distribution tree are discussed herein, principles relating to data distribution infrastructure are not limited to any particular tree building procedure. Such principles may preferably involve the utilization of a distributed configuration which exploits the sharedpaths of data distribution of multicasted messages, such that message retransmissions only occur at the point of divergence of the data distribution path.

A method in accordance with at least one embodiment of the present invention may be particularly useful when it is necessary to utilize multicast tunnels in the communications network. In this connection, such a method may preferably include an extension of an existing point to point protocol by way of an additional address field which allows for the addressability of subsets of receivers. As a result, the data distribution path will be different for each subset of receivers. The propagation path utilizes a piece wise point to point propagation pattern, which allows a node in the multicast distribution tree to transmit data to any of its descendant nodes in the tree via a tunneled connection.

In accordance with another presently preferred embodiment of the present invention, the problem of the distributing data packages to a refined set of subscriber nodes is solved by the provision of a method which constructs multicast distribution trees for the Subsource Addressing Multicast protocol and which includes publish and subscribe operations, involving the nodes in a communications network. Again, this method preferably utilizes a multicast distribution tree, and a specific manner of constructing multicast distribution tree construction method is detailed herein. Again, though a specific method for the construction of the distribution tree is detailed herein, it is to be understood that the methods for data transmission and data subscription discussed herein are applicable to any kind of multicast distribution tree.

In summary, the present invention provides, in one aspect, a method of facilitating notification among at least two nodes in a distributed network, the method comprising the steps of: designating one of the nodes as a publisher node; designating at least one other of the nodes as at least one subscriber node; propagating a transmission from the publisher node to the at least one subscriber node via at least one link; the propagating step comprising propagating only one distinct transmission along any single link.

In another aspect, the present invention provides an apparatus for facilitating notification among at least two nodes in a distributed network, the apparatus comprising: an arrangement for designating one of the nodes as a publisher node; an arrangement for designating at least one other of the nodes as at least one subscriber node; an arrangement for propagating a transmission from the publisher node to the at least one subscriber node via at least one link; the propagating arrangement being adapted to propagate only one distinct transmission along any single link.

Furthermore, in an additional aspect, the present invention provides a program storage device readable by machine, tangibly embodying a program of instructions executable by the machine to perform method steps for facilitating notification among at least two nodes in a distributed network, the method comprising the steps of: designating one of the nodes as a publisher node; designating at least one other of the nodes as at least one subscriber node; propagating a transmission from the publisher node to the at least one subscriber node via at least one link; the propagating step comprising propagating only one distinct transmission along any single link.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
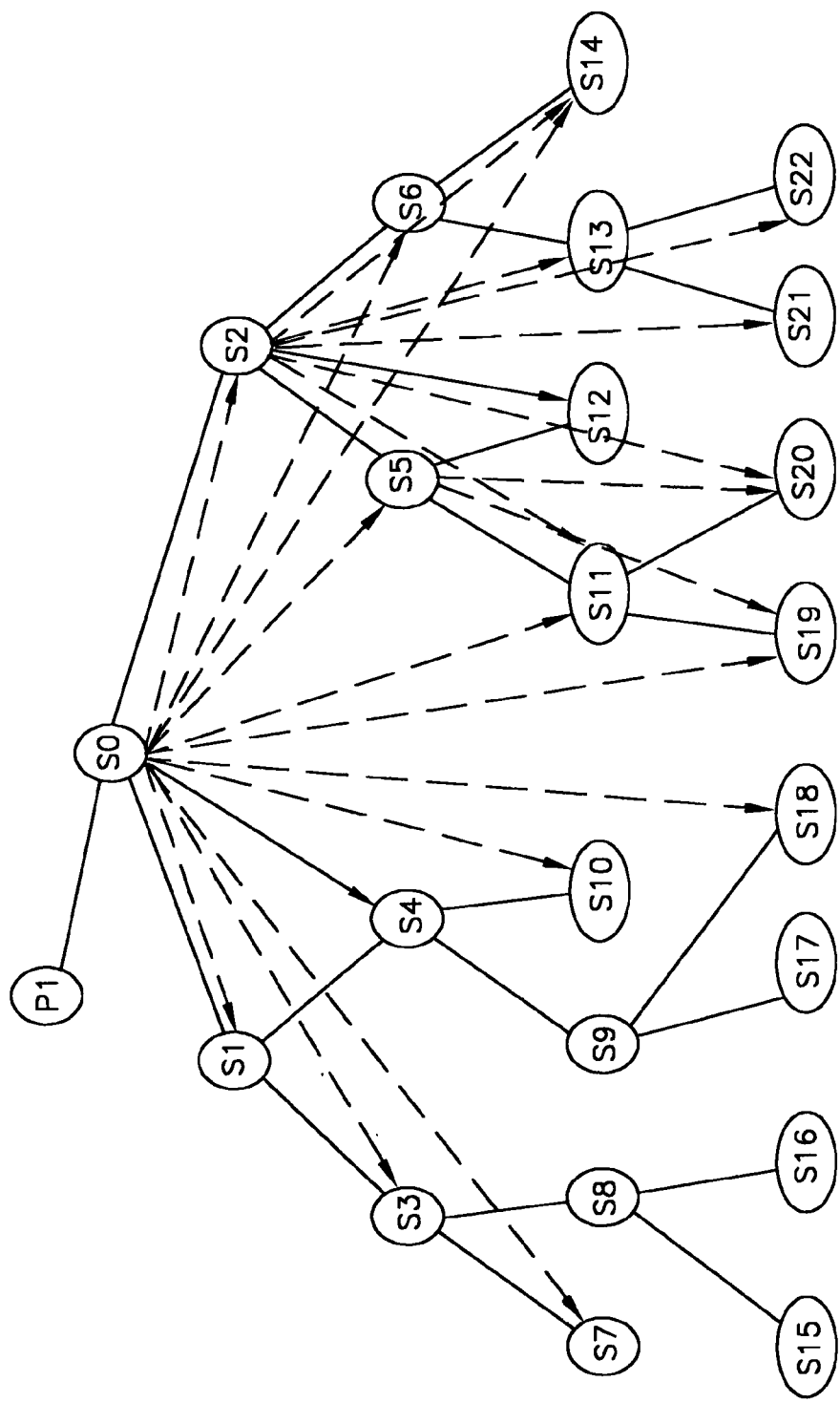
FIG. 1 schematically illustrates a distribution tree and some possible paths for data propagation.

Several other copending and commonly owned U.S. patent applications, filed concurrently herewith, disclose various processes and arrangements whose details may, in the role of background information, help provide a better understanding of one or more of the embodiments disclosed and contemplated herein. Accordingly, those applications are hereby fully incorporated by reference as if set forth in their entirety herein, and are as follows (including the title and Application Serial No. for each one): "Methods and Apparatus for Updating Subsource Addressing Multicast Routing Records in a Communications Network" (application Ser. No. 09/906,597); "Methods and Arrangements for Building a Subsource Address Multicast Distribution Tree Using Traced Routes" (application Ser. No. 09/906,936); "Methods and Arrangements for Building a Subsource Address Multicast Distribution Tree Using Point to Point Routing Records" (application Ser. No. 09/906,937); "Methods and Arrangements for Building a Subsource Address Multicast Distribution Tree Using Network Bandwidth Estimates" (application Ser. No. 09/906,939); "Methods and Arrangements for Dynamically Modifying Subsource Address Multicast Data Distribution Trees" (application Ser. No. 09/906,596); "Methods and Arrangements for Monitoring Subsource Addressing Multicast Distribution Trees" (application Ser. No. 09/906,593); "Methods and Arrangements for Establishing a Group Collaboration Session Utilizing Multiple Multicast Distribution Trees" (application Ser. No. 09/906,935); and "Methods and Arrangements for Multicasting a Data Stream at Different Data Rates to Groups of Subscribers" (application Ser. No. 09/906,938).

Throughout the present disclosure, various terms are utilized that are generally well-known to those of ordinary skill in the art. However, for the purposes of providing additional clarity, a number of such terms are briefly defined immediately herebelow. (Though one or more of the terns may well be defined elsewhere herein, it is deemed useful at this juncture to gather all of the following terms in one place, to provide a glossary of sorts that may serve, when needed, as a convenient and easily discernible reference point.)

A "data distribution path" is defined as the sequence of routing nodes which a specific message traverses from the moment that it originates in a publisher node to the moment that it arrives in a receiver node.

A "node" is a general vertex in the multicast distribution tree. There are three specific types of nodes in a SAM tree: the publisher node, which is the root of the tree, the intermediate nodes, which are the nodes with child nodes which are not the root node, and the leaf nodes, which are nodes without any children nodes. The term node is used in this embodiment to generally refer to any of type of node in the SAM tree.

As employed herein, the term "package switching operation" is used to refer to the operation performed by intermediate nodes, also called router nodes, in the data distribution path of a given data transmission. This operation involves receiving the data package and then making a decision of where to retransmit it, if necessary. This decision is made utilizing data that is stored in the proximity of the router node, generally referred to as routing tables. After the routing table are consulted, a package switching node will retransmit (switch) a package to either another intermediate router node or the final receiver of the package.

The term "piece wise point to point" is used to describe the way in which the SAM technology exploits the underlying point to point network protocol in multicasting a message to a plurality of receivers. A SAM message originates a the root node and is addressed with the point to point address of either a final receiver node or an intermediate router node. Whenever an intermediate router node receives a SAM message, it will retransmit it to one or more point to point addresses, of either final receivers or intermediate nodes. This operation is repeated until the message finally reaches a final receiver, or leaf node in the SAM tree. Therefore, a single message is transmitted to a variety of receivers utilizing different point to point addresses along the transmission path. It can thus be said that SAM transmissions are always made using the point to point mode of transmission at every step (piece) of the transmission path, and that the transmission pattern is therefore piece wise point to point.

The term "point of divergence" refers to a node in the SAM tree which has more than one descendant node to which it has to route a given message.

The term "point to point" is used to refer to a transmission mode in which a given message is transmitted from a single source (or point) to a single receiver. Typically, communication networks only support point to point protocols, the most prevalently used being the Internet Protocol (IP) and the Asynchronous Transfer Mode (ATM) protocols. Other modes of transmission are possible, such a broadcast and multicast. Such protocol can be implemented extensions of the underlying (basic) point to point protocol.

The term "point to point address" refers to a network address utilized by basic point to point protocol provided by the communications network.

The term "protocol tunneling" refers to a technique which makes possible to transmit a data package encoded by a given protocol in a network which does not offer direct support for the protocol. The technique involves the encapsulation of the data package into a data segment which is addressed utilizing the basic point to point protocol supported by the network. The package is then transmitted from to a node which is able to receive and process it. These two nodes are referred to as the end points of the tunnel. The receiving node is then able decapsulate the original data package and retransmit it further. Eventually, the package arrives at a network which offers native support for the protocol.

A "publisher node" is a node which is a source of a given information. In SAM, messages are multicasted to a plurality of receivers utilizing a distribution tree, named the SAM tree, which is rooted at the publisher node.

The term "predicate" is used to refer to an additional data field used by SAM to extend the addressing capability of an underlying point to point protocol. This field is used by applications to store data which is used to define specific subsets of the information that originates from a publisher node.

The term "router node" is used to refer to a node which retransmits a given data package such that it can reach a specific final destination. The term "package switching node" is synonymous with this term.

"SAM" is an abbreviation for "Subsource Addressing Multicast".

The term "SAM protocol" refers to the collection of methods and operations which are used by source nodes to express interest in the subsets of information published by a given source, and by the source of information to publish message to subsets of subscribers.

The "SAM tree" is a data structure utilized to multicast messages from the node which is the source of the tree. The intermediate nodes (nodes without children) of the SAM tree are nodes which are capable of routing SAM messages to any of their descendants. The leaf nodes (nodes without children) are nodes that are final receivers of SMA messages. It is also possible for an intermediate node to be a final receiver of a SAM message.

The term "shared paths" is used in reference to the intersection of transmission path segments for a message addressed to a plurality of subscribers. In this embodiment this term is used in reference to both point to point and multicast routing paths. A point to point shared transmission path between two receivers of a message occurs when the routing decisions taken by the underlying point to point protocol define paths that traverse the same sequence of routing nodes for some portion of the paths. Similarly, a multicast shared path is an equal sequence of multicast routing nodes in the transmission paths for messages destined for multiple multicast addresses. In the field of multicast communications, performance gains are realized by exploiting common transmission paths, or shared paths, in both the point to point and the multicast package switching infrastructure.

The term "subsource addressing multicast" is used to collectively refer to a set of technologies which make possible for a source of information to multicast messages to any given subset of its receivers. This technology includes the SAM protocol and the SAM tree discussed above.

As employed herein, a "subscriber" is a node which has posted at least one subscriber operation, and a final receiver of SAM messages.

The term "tunneling" refers to the act of deploying a protocol tunnel (described above) for the transmission of a message.

The term "underlying protocol" is used to refer to the basic point to point protocol supported by the communications network.

At least one presently preferred embodiment of the present invention broadly embraces a multicast distribution tree capable of realizing multiple distribution paths. The distribution tree may be referred to as a Subsource Addressing Multicast tree, or a SAM tree. As described hereinbelow, the SAM tree is capable of realizing optimal distribution paths for any subset of the nodes of a given source which is the root of the tree. The tree is preferably configured such that it can be deployed as an extension of any underlying point to point protocol.

In accordance with at least one presently preferred embodiment of the present invention, the SAM multicast distribution tree is distinguished from other distribution trees because any given intermediate node can propagate a message not only to its direct descendants, but also to any number of indirect descendants. Therefore, in addition to keeping the basic state information which is required from a multicast distribution tree, such as parent and direct descendant information, each intermediate node in the tree also keeps data related to the propagation to indirect descendants. In other words, the SAM multicast tree can be used to propagate messages in a plurality of paths. In actuality, the SAM trees allows for the all possible combinations of data transfer paths between the root node of the tree and all possible subsets of its descendants. The SAM tree can therefore be utilized to support a very fine grained addressing scheme, such as the SAM protocol.

FIG. 1 illustrates a SAM tree and a few of the possible paths for data propagation from the node S0, denoted by the dotted arrows. Not all possible paths are shown, so as not to impair the clarity of the illustration. Each parent node is capable of sending a message directly or via a protocol tunnel to any of its descendants. The collection of all possible subpaths generate a distribution mesh capable of efficiently multicasting messages to any subset of receivers making optimum use of the shared transmission paths among receivers.

The data propagation patterns determined by the SAM propagation tree are preferably such that a message destined for multiple nodes will incur a minimum number of retransmissions. In one embodiment, this is achieved by forcing the retransmissions to occur only at the points of divergence in the propagation path. This will result in the optimal utilization of shared paths among the subsets of receivers of the message. The direct transmission of a message from a parent node to its descendants can be made via a protocol tunnel, which will result in further gains in performance.

Preferably, the SAM tree includes a root node P1, which is the publisher of information, and a set of nodes (e.g., S0–S22) which are either direct or indirect descendants of the root node P1. The descendants of the root node P1 can be either the final destination of notification messages or intermediate router nodes. A router node is a node is capable of forwarding notification messages to other router nodes or subscriber nodes. A subscriber node is a node which is a final destination for a notification message. A router node may be a subscriber node as well as a router node.

As previously mentioned, multicast capability is usually added to a network as an extension of some previously existing point to point protocol. Preferably, the SAM tree is configured such that it makes an optimal use of the existing point to point message switching infrastructure. When a parent node in the SAM tree relays a message to one if its descendants utilizing the descendant's point to point address directly, it is avoiding the overhead of making several package switching operation at each intermediate node in the path from the parent to the descendant.

Since SAM extends the addressing capability of the underlying point to point protocol, it involves two kinds of data switching operations:
i. the basic point to point package switching operation
ii. the extended multicast package switching operation, which is performed by the nodes in the network which function as SAM routers.

The direct addressing capability of the SAM tree results in a savings of both kinds of package switching operations, which makes SAM a very efficient multicast package switching infrastructure.

Preferably, the SAM communication infrastructure keeps specific state information in every node which participates in a SAM network. Accordingly, each node in a SAM network preferably keeps the following state:
i. Point to Point Address of the parent node
ii Point to Point Address of each child node
iii. SAM distribution lists for any of the subsets of the node's descendants In a preferred embodiment, the distribution lists are identified by a predicate field, which extends the addressing capability of the underlying point to point protocol. This extra field is utilized by the specific application which uses the SAM protocol to identify subsets of receivers of the published information. The utilization of an application specific predicate field as a network address is a unique characteristic embraced herein.

The aforementioned embodiment carries out a preferred implementation of the SAM tree utilizing subscription and notification operations which utilize the predicate field. Here, an implementation utilizing the IP protocol as the underlying point to point protocol is discussed, but it should be understood that any similar implementation utilizing any other underlying protocol will not deviate from the spirit or scope of the present invention.

Preferably, the network addresses in SAM are defined by a pair of the following format:
 <source,predicate> where:
i. The address of a source of information is itself expressed as a pair of the format [host address, port number]. The host address conforms to the addressing scheme of the underlying point to point protocol. In a sample implementation using TCP/IP this address can be given in dotted decimal format, or alternatively as a host name which can be mapped into a network address, and the port number refers to a communication port which is bound to the publisher process.
ii. The predicate field is utilized by the subscribers to specify a predicate which is interpreted by the publisher process to select a subset of the information stream.

(Though it is feasible to implement SAM over a variety of network protocols, the present discussion will be limited to implementation based on TCP/IP.)

For example, suppose that the publisher provides an information stream including an integer series which is updated at every second. For the present discussion, this information stream may be labeled "the value of X".

Assume now that a subscriber process wants to receive the current value of X, which is published by node P1 at port 7777, but only if X is greater than 130. In SAM, it is possible to express this specific interest with the following network address:

<P1:7777,"X>130">

In another example, the values of the X series indicate unique identifiers which label data items. Therefore, the subscriber could express the desire to receive updates of an item numbered 12345, published by P1 at port 8888, utilizing the following SAM address:

<P1:8888,"X=12345">

The SAM predicate value is preferably handled as a binary value which extends the IP network address, therefore "refining" the granularity of the addressability. It is therefore possible for subscribers to utilize any value, as long as this value can be understood by the publisher of the information. The routers using the SAM protocol have no semantic understanding of the predicates; they are handled exactly as network addresses. This allows SAM to be utilized by essentially any type of publisher system, even supporting different lengths in the predicate field.

Figure 2:
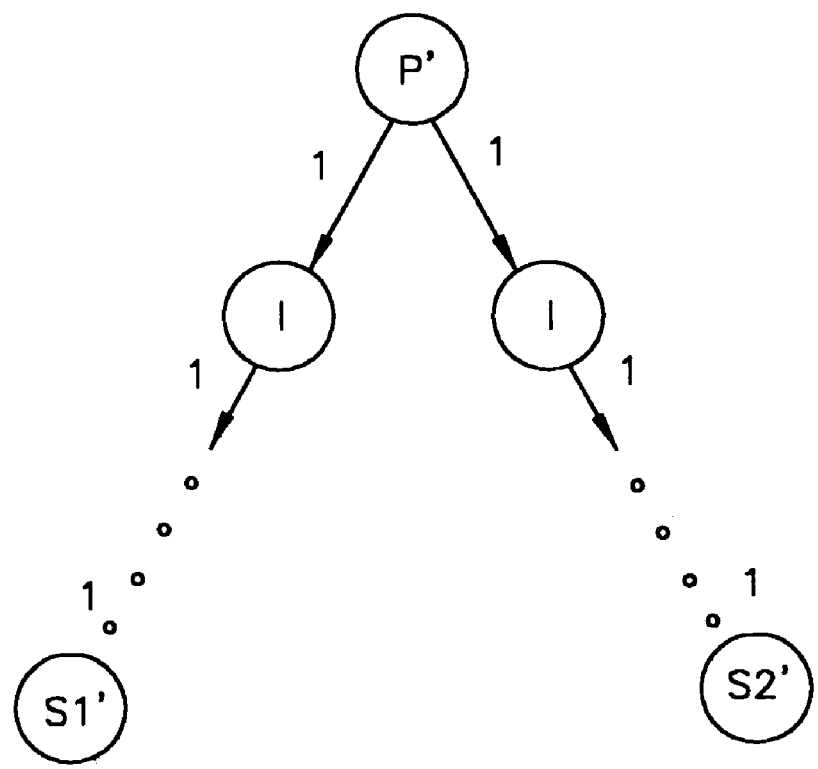
FIG. 2 shows a portion of a distribution tree, including two subscriber nodes.

In order to make the most efficient use of the network, notification messages which originate at the publisher node P1 should preferably be routed such that a single transmission originates at the publisher node and such that a minimum number of retransmissions occurs along the routing paths. More specifically, an optimal routing of a message that is directed for a plurality of receivers should only generate one transmission along the path to each receiver. As shown in FIG. 2, consider any two subscriber nodes (S1', S2') which need to receive a common message from a source node P'. ("I" in the drawing refers to intermediate nodes.) A common path will either exist between subscriber nodes S1' and S2' or not. If there is no common path, then two transmissions need to be generated at the source P', one directed at each path, and since only one transmission is needed for each path, then the utilization of the network has been minimized. The numeral "1" in the drawing indicates a single transmission along a particular path.

Figure 3:
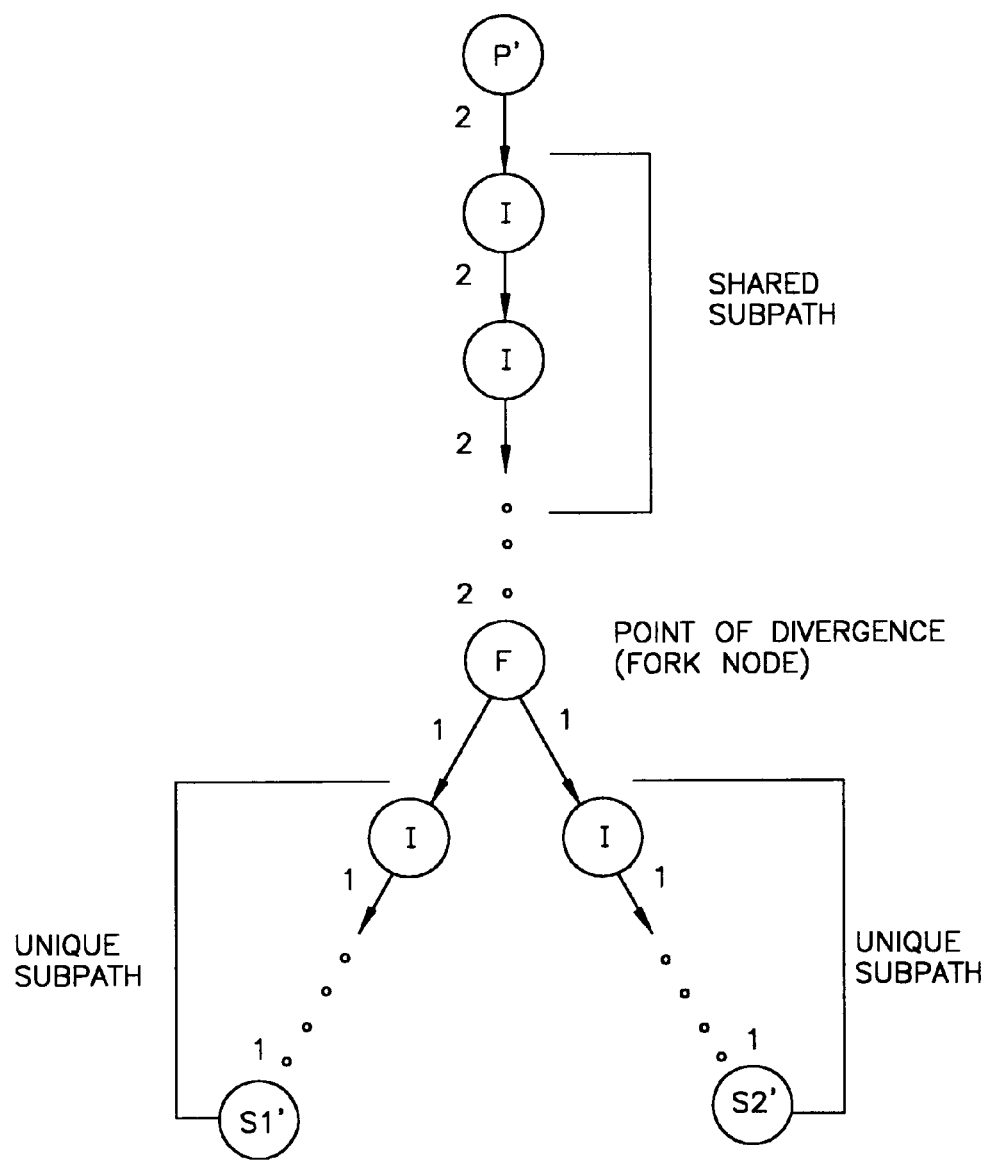
FIG. 3 shows a portion of a distribution tree in which two subscriber nodes share at least part of a common path from a publisher node.

If, on the other hand (as shown in FIG. 3), the subscribers S1' and S2' share (to some extent) a common path, then the simple approach of sending two notification messages will generate more than one transmission. Since optimal distribution is elusive, it is apparent that an alternative to optimal distribution is to send a single message along the common path (e.g. via two intermediate nodes I), and to only retransmit the message at the point where the path to the different subscribers diverges. This point is called a fork node, indicated by "F". In the drawing, the numeral 2 indicates that there are two transmissions up to the fork node F, while beyond the fork node there are individual transmissions propagated respectively towards subscriber nodes S1' and S2'.

Figure 4:
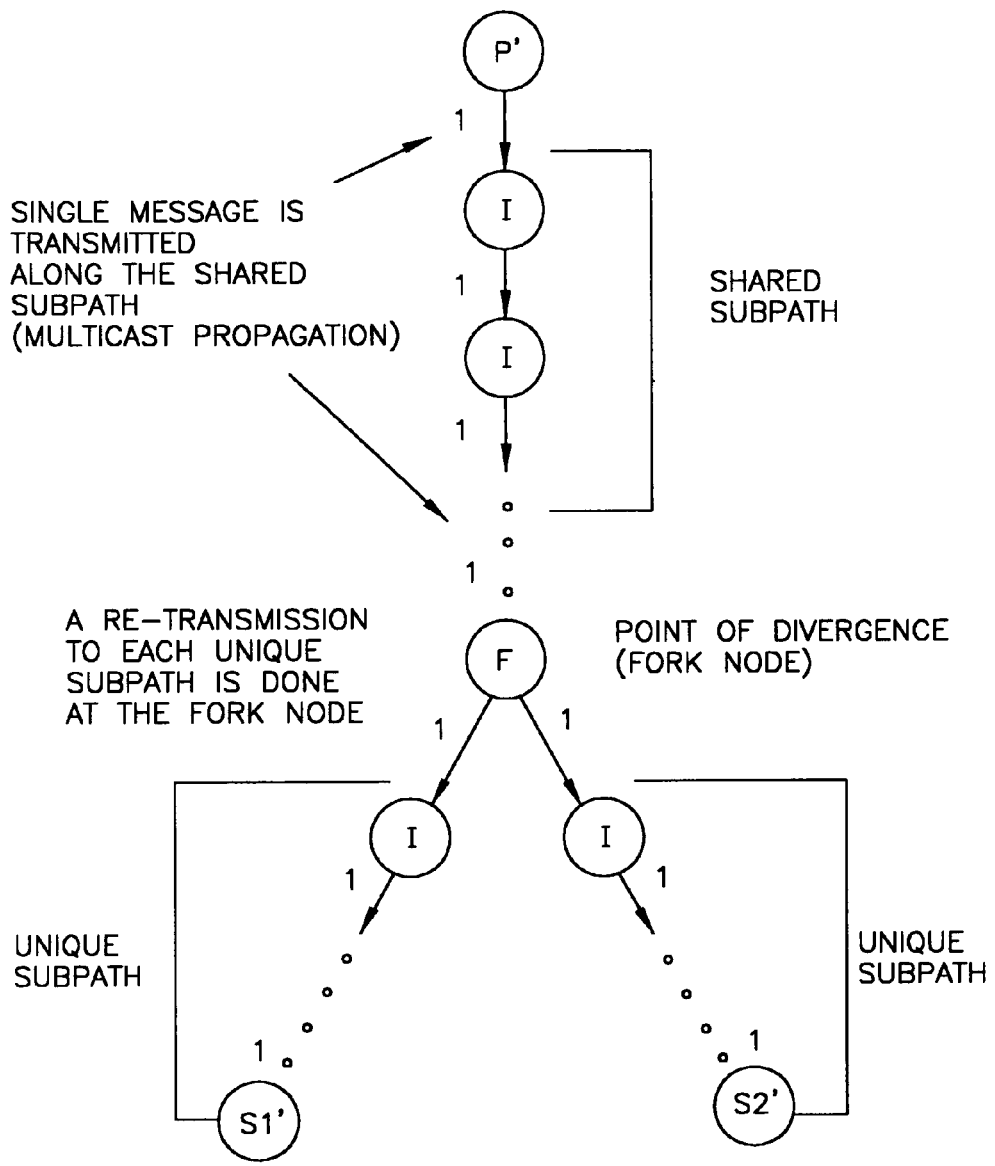
FIG. 4 is substantially similar to FIG. 3 but illustrates optimal transmission using a single message per link.

In accordance with at least one presently preferred embodiment of the present invention, a SAM subscription protocol was designed to identify the common paths between a source and several receivers of a given message, and make an optimal use of them, as described here below. FIG. 4 illustrates optimal transmission using a single message per link, noted by the numeral "1". Particularly, FIG. 4 illustrates an objective associated with at least one presently preferred embodiment of the present invention, namely, an optimal transmission that requires only single transmissions, at all links, between a publisher node P' and subscriber nodes S1' and S2', interspersed with intermediate nodes I and a fork node F.

A SAM protocol may involve at least two basic operations, namely, subscription and notification. Each operation may involve a distributed protocol which involves neighboring nodes in a SAM distribution tree. The mechanics of routing, the identification of fork nodes and their exploitation can be easily observed by studying the data flow of these two operations. "Subscription" involves the identification of fork nodes, while "notification" involves the exploitation of fork nodes.

Preferably, subscription operations originate at the subscriber nodes, and are sent hop by hop to each ancestor node in the SAM distribution tree, in the direction of the publisher node. The reason for this hop by hop propagation procedure is that a record of the subscription is left at each node in the path that goes from the subscriber node to the publisher. These records allow the intermediate nodes to detect when two or more subscriptions with identical addresses have been posted by descendant nodes. Such nodes can be proven to be a point of divergence, or fork node in the notification path of multicasted messages which originate at the root, as discussed above. A proof is discussed further below.

Figure 5:
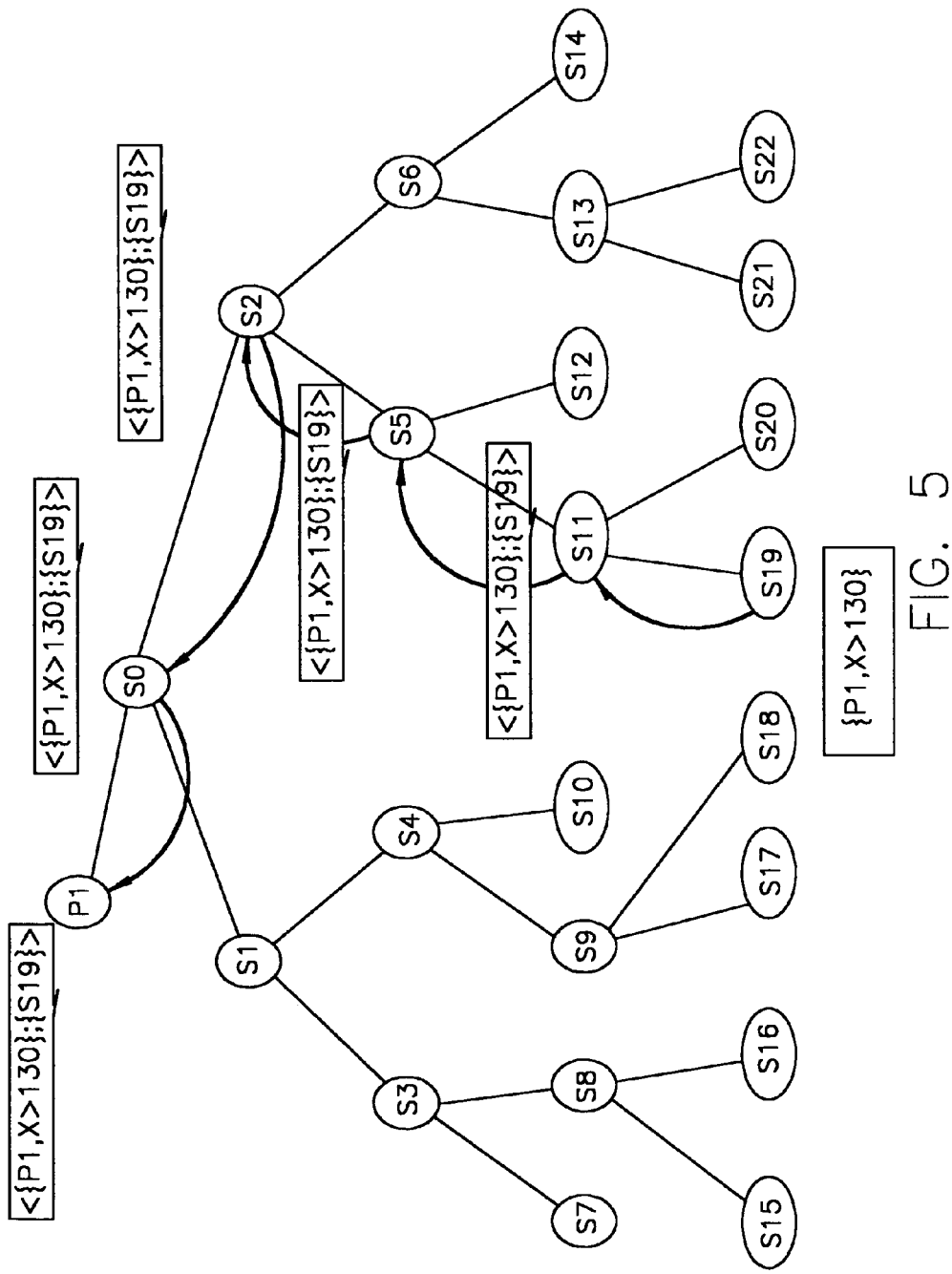
FIG. 5 shows, in a distribution tree, the propagation path of subscription messages.

FIG. 5 shows the propagation path of subscription messages along a SAM tree, in accordance with a preferred embodiment of the present invention. In accordance with FIG. 5, one may examine the subscription records which are kept at each intermediate node, and understand how the bottom up, hop by hop propagation of the subscription messages allows the intermediate nodes in the SAM tree to detect fork nodes in the message stream which originates at the root node.

In the example contemplated by FIG. 5, the client in S19 wishes to be notified when the value of the content variable X reaches a value greater than 130. A directory lookup is made, and the group address for the publishers of X is retrieved, in this case only P1 publishes X. A subscription record is now made, including a pair <subscription_address, notification_list>. In the present example, this pair is labeled <{P1,"X>130"},{S19}>, where i. The label {P1,X>130} is the subscription address, where P1 is the source address and the string "X>130" is the predicate. This string is treated by the routing nodes as an actual address, based on its binary value. The routing nodes need have no knowledge of the semantics of the string, i.e., that it represented an inequality between a variable X and the constant 130. Only the subscription client and the publisher node need to understand the contents of the subgroup address. The publisher node utilizes this knowledge to filter the value of X and only notify subscribers when appropriate.

ii. The list {S19) is the notification list, which at this point contains only one element.

Once a subscription notification reaches the destination publisher, the subscription becomes active. Since the subscription record contains the notification list {S19}, the publisher can now notify S19 when the value of X reaches 130, using whatever path the underlying network considers appropriate, as discussed herebelow.

Figure 6:
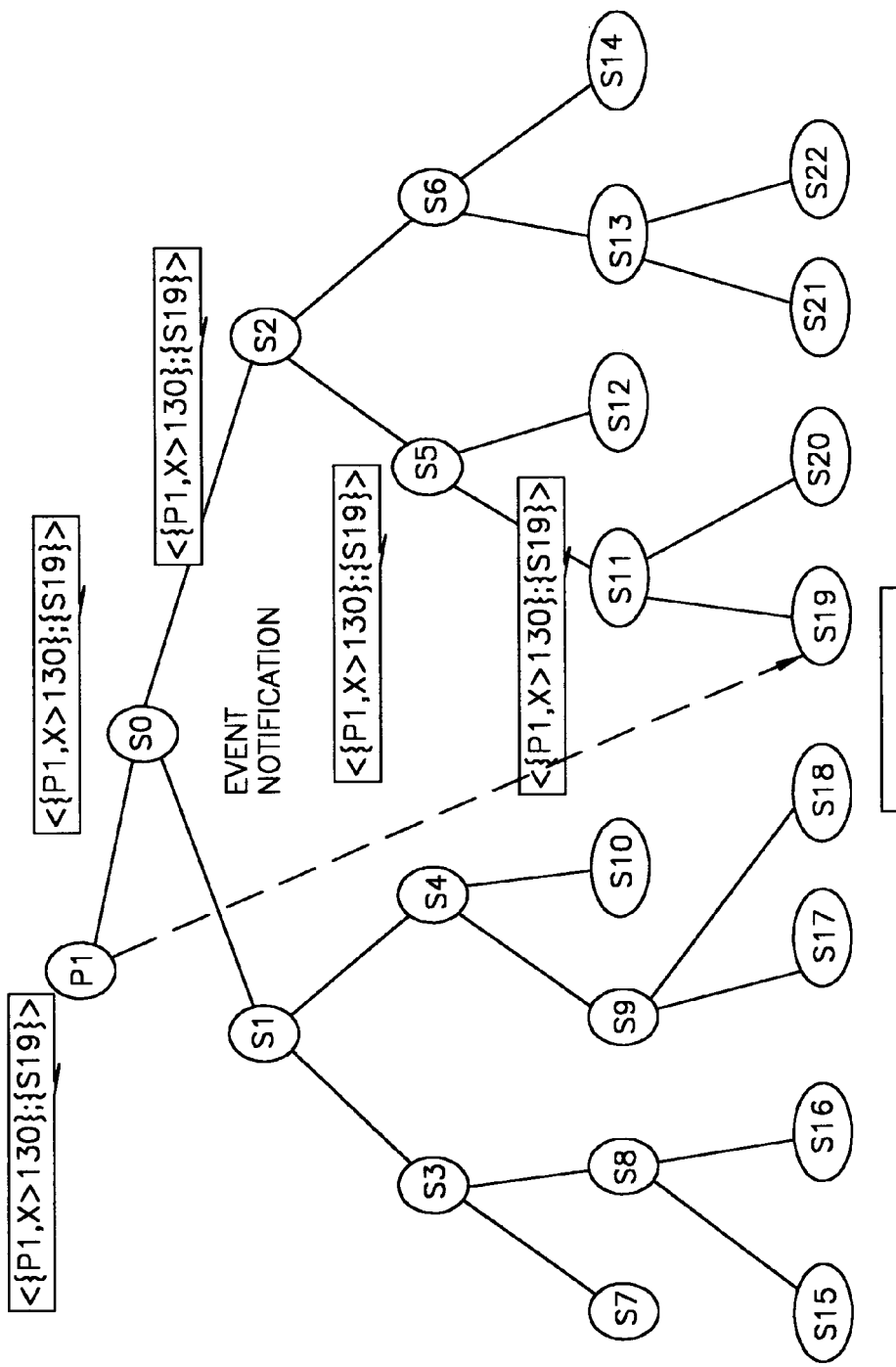
FIG. 6 illustrates, in a distribution tree, a notification being addressed directly at a single subscriber node.

Preferably, notification operations in accordance with at least one embodiment of the present invention originate in the publisher node P1, which is the root of a SAM distribution tree. The notification messages can be directed at one or more descendant nodes, but they do not propagate in a "hop by hop" process (i.e., successively from one node to a neighboring node). Rather, the notification messages preferably address each descendant node directly, utilizing a point to point address provided by the lower layer network protocol of choice. FIG. 6 illustrates a notification being addressed directly at the subscriber node S19.

In FIG. 6, the dotted arrow indicates that the point to point address for S19 is used to address the notification message for the subscriber. This indicates that the package can be delivered directly without intervention of the SAM router nodes, although it may be routed by the underlying network protocol, such as IP in this case. The notification messages originate at root node of the SAM tree and are propagated utilizing point to point transmission to the descendant nodes of the distribution tree and are delivered directly to subscriber nodes or to intermediate nodes. The intermediate nodes are only used when it is the case that two or more notifications share a common path to some intermediate node, and then diverge to distant destinations. The nodes which represent a point of divergence are called "fork nodes". The entire potential of the selective routing feature of the multicast routing protocol is realized by utilizing a single transmission along this common path between the notification messages. This helps explain why the subscription protocol described hereinabove utilizes a hop-by-hop transmission pattern, which builds a bottom-up record of the subscription data. During the bottom-up propagation, the fork nodes are identified and are then utilized by the publisher to notify a plurality of subscribers, utilizing any common path between them. This process of notification is discussed in more detail hereinbelow.

Figure 7:
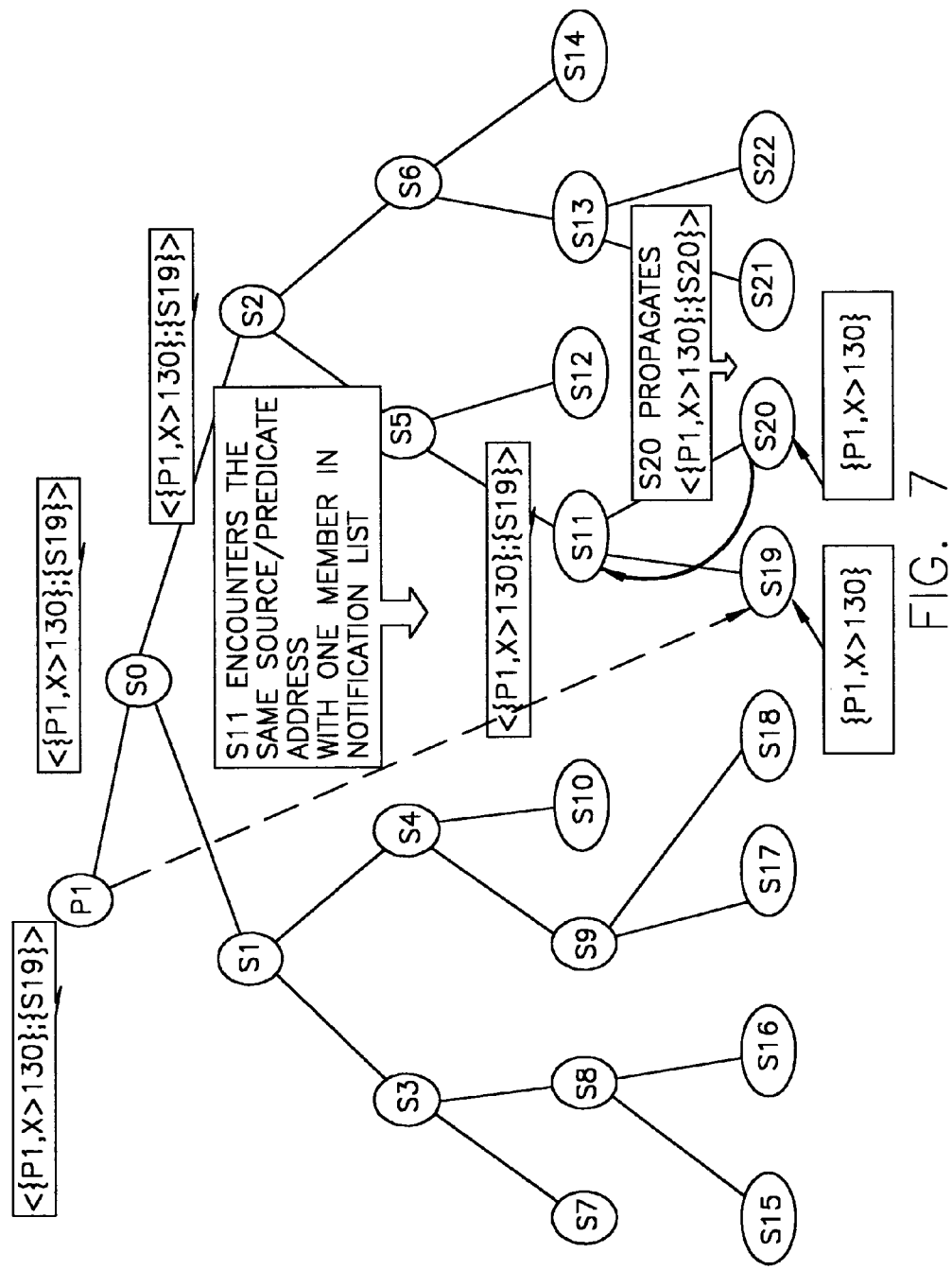
FIG. 7 shows, in a distribution tree, the propagation of a subscription hop by hop to an ancestor node.

In the sample subscription and notification operations discussed above, a single subscriber received a message via a point-to-point transmission, and thus there was no need to deploy a multicast transmission mode. However, such a need arises when a second subscriber posts a subscription to the same content field, as discussed below. In the example which follows, the subscriber labeled S20 posts a subscription with an identical SAM address as the previous subscription made by S19. This subscription is then propagated hop by hop to the ancestor node, S11, as shown in FIG. 7.

When S11 receives this subscription message, it compares it against the record of previously received subscriptions, and will discover that an identical subscription had been posted by S19. Therefore, S11 detects that it is a fork node in the distribution path which includes S19 and S20. As demonstrated above, the most efficient way to multicast a message to two sources which have a shared subpath, is to transmit the message first to the fork node, which will then retransmit separate messages to each diverging subpath. Therefore, once an intermediate node detects that it is a fork node for a subscription, it will send a message to its ancestor nodes such that the distribution path is changed. It will then send a substitution message to its ancestor node, indicating that for the given predicate, the previously named receiver should be substituted by the fork node address, with the format:

<predicate,previous_receiver, new_receiver>

In the example above, the fork node would send to the ancestor node the following message:

<"X>130", S19, S11>

Figure 8:
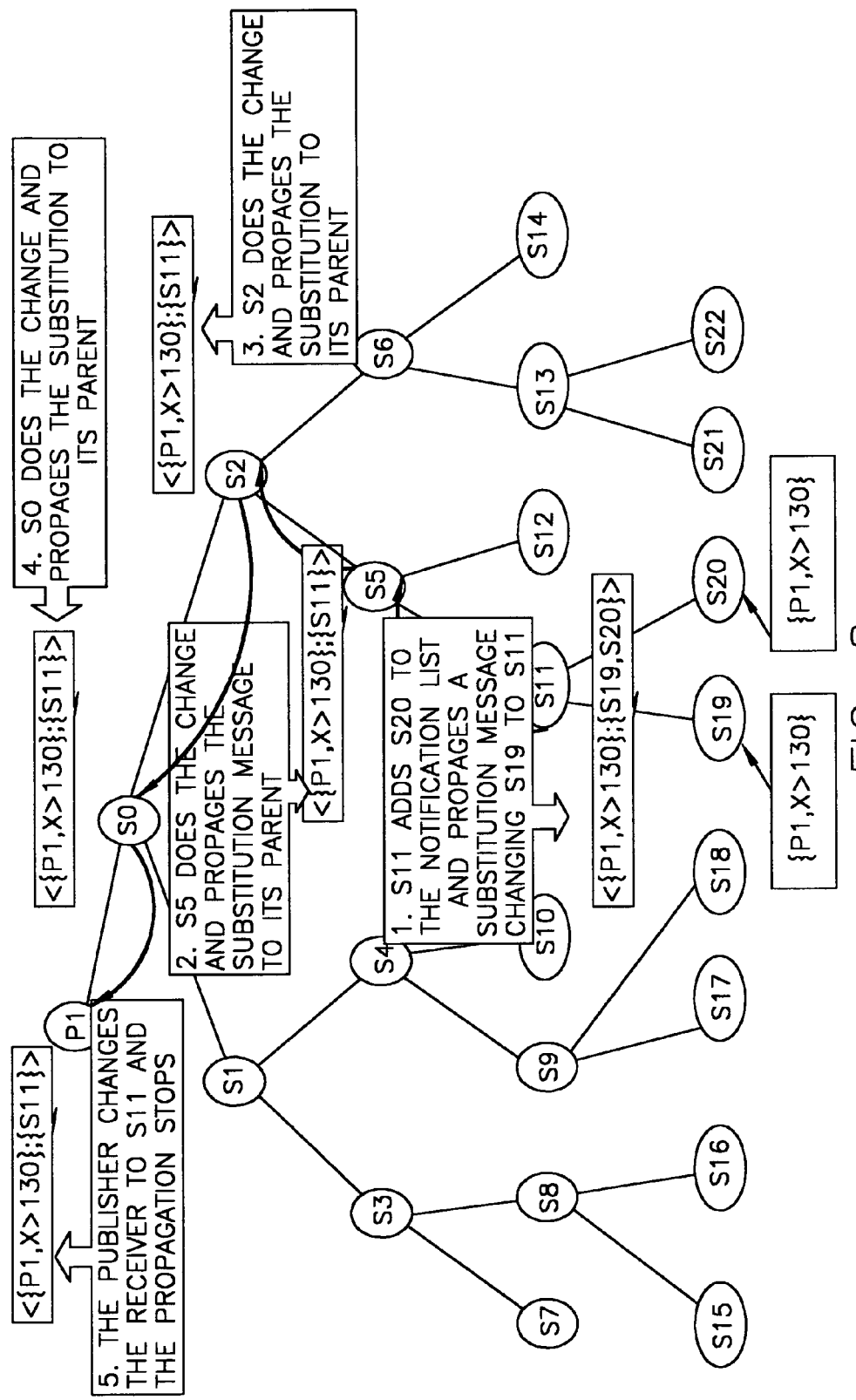
FIG. 8 shows, in a distribution tree, a manner in which a fork node modifies its distribution list

Each ancestor node which receives this substitution message will change its subscriptions records appropriately and forward the message to its ancestor, following the same hop by hop propagation pattern as, preferably, with any subscription, and therefore effectively changing the routing information in all intermediate nodes. In FIG. 8, the fork node S11 has modified its distribution list for the predicate "X>130", such that it now includes both nodes S19 and S20 (a distribution list with more then one destination is a characteristic of a fork node). It then propagates the substitution message to S5, which will in turn substitute S19 for S11 (the fork node) in its distribution list associated with the predicate "X>130").

Figure 9:
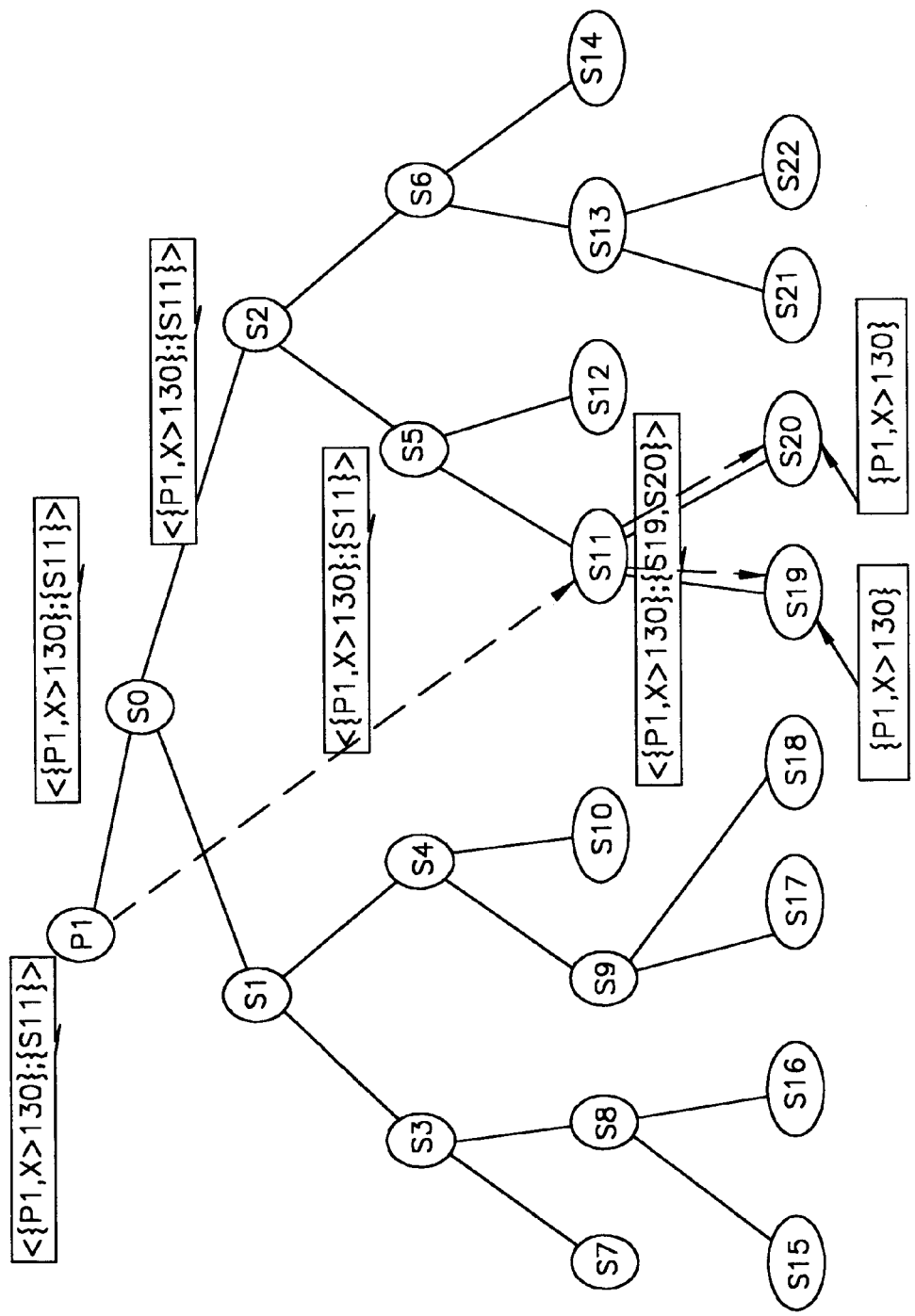
FIG. 9 shows, in a distribution tree, a manner in which notifications may be retransmitted to subscriber nodes point to point.

After modifying its routing information for predicate "X>130", the intermediate node S5 propagates the substitution message to its ancestor, S2, which will then change its routing information as shown above. S2 then forwards the substitution message to its ancestor, S0. This node will in turn change the routing information for predicate "X>130", and continue the upward propagation of the substitution message, directing it at S0. This node will then change its routing information for predicate "X>130", and forwards the substitution message to the root of the SAM tree, which is the root node P1. This completes the propagation of the substitution message. From this point on, all future notifications of predicate "X>130" will now be directed to the fork node S11, to be retransmitted to the subscribers S19 and S20 in point to point manner, as illustrated in FIG. 9.

Figure 10:
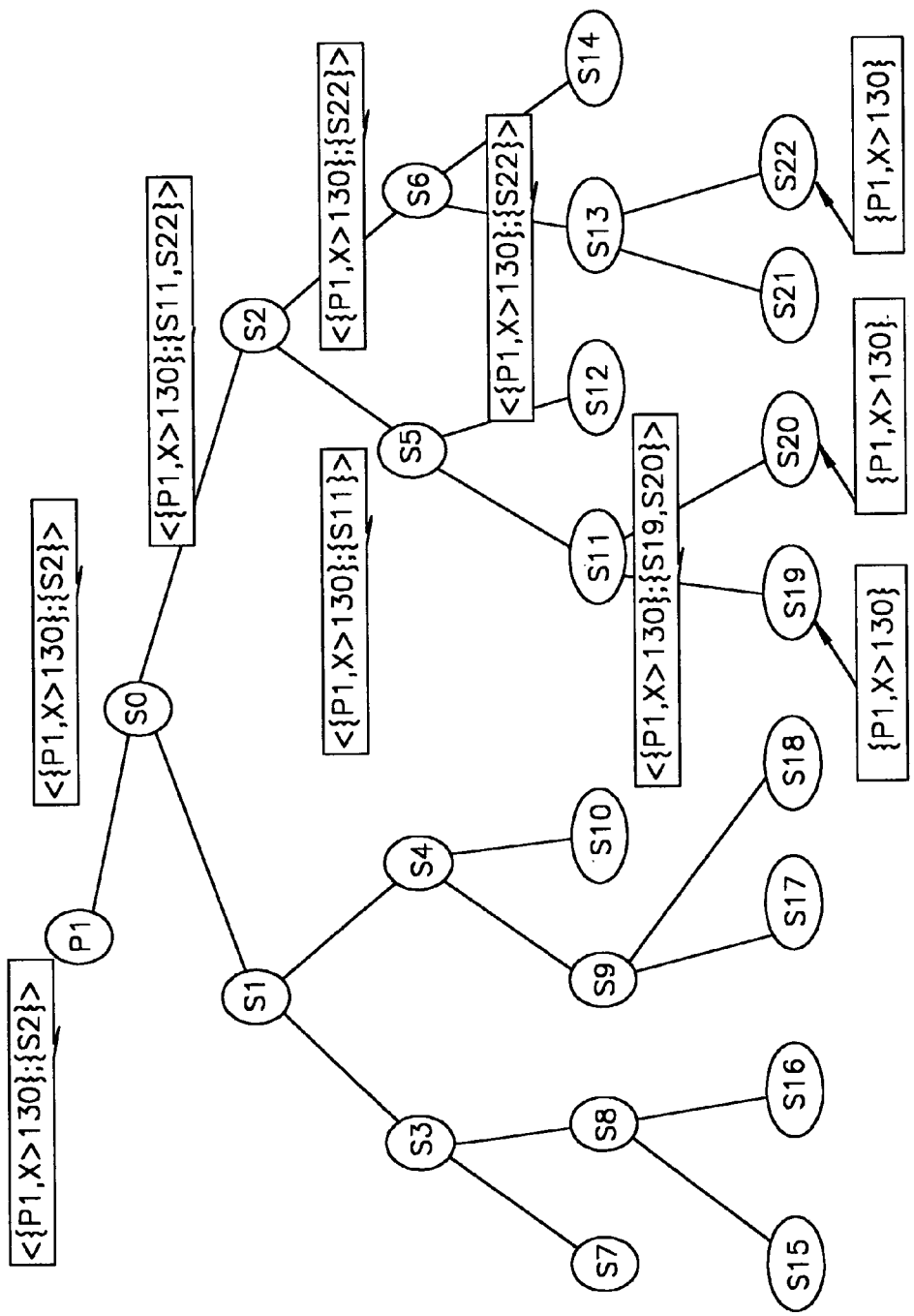
FIG. 10 shows, in a distribution tree, the resulting network state after a node posts a subscription.

In order to illustrate the process further, FIG. 10 shows the resulting network state after node S22 posts a subscription for the same content. In this case, the subscription message is propagated hop by hop up the SAM tree, and the fork node condition is noticed by S2, which is the common ancestor node for the 3 subscribers to the same content: S19, S20 and now S22. Again, the fork node, now S2, changes its routing information for the given predicate, now having two destinations, S11 (another fork node) and S22 (a subscriber). S2 then sends a substitution message to its ancestor S0, notifying it of its condition as fork node for the predicate "X>130". FIG. 10 shows the state of the routing tables after these steps.

Figure 11:
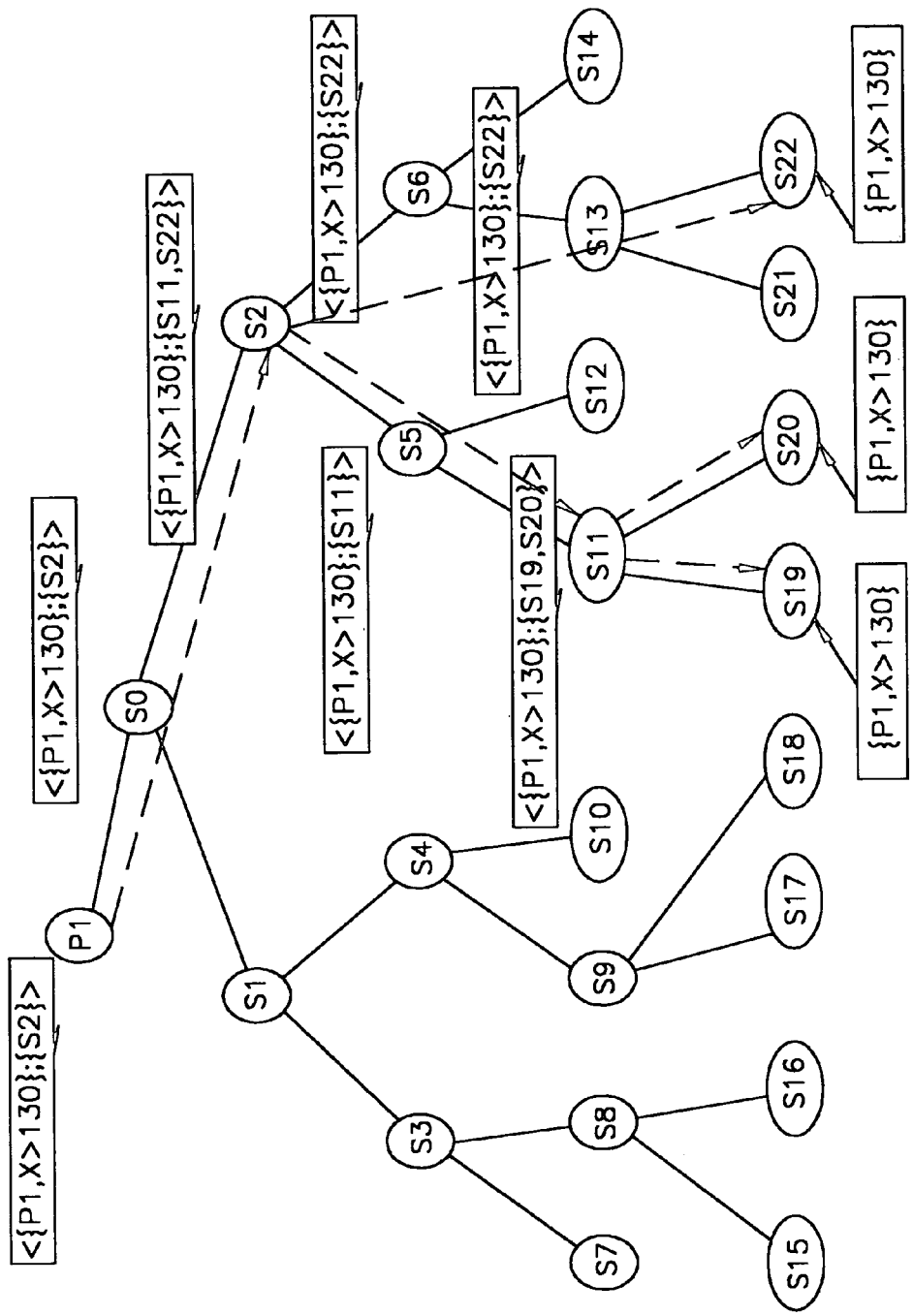
FIG. 11 is substantially similar to FIG. 10, but shows modification of the notification path.

The notification path is therefore modified, as shown in FIG. 11. It should be noticed that a single transmission is made from P1 towards S2, which then relays it to S22 and S11. Since S11 is also a fork node, it will also relay the notification the two other receivers, S19 and S20. It can be noted that only one message is transmitted in any particular subpath.

Figure 12:
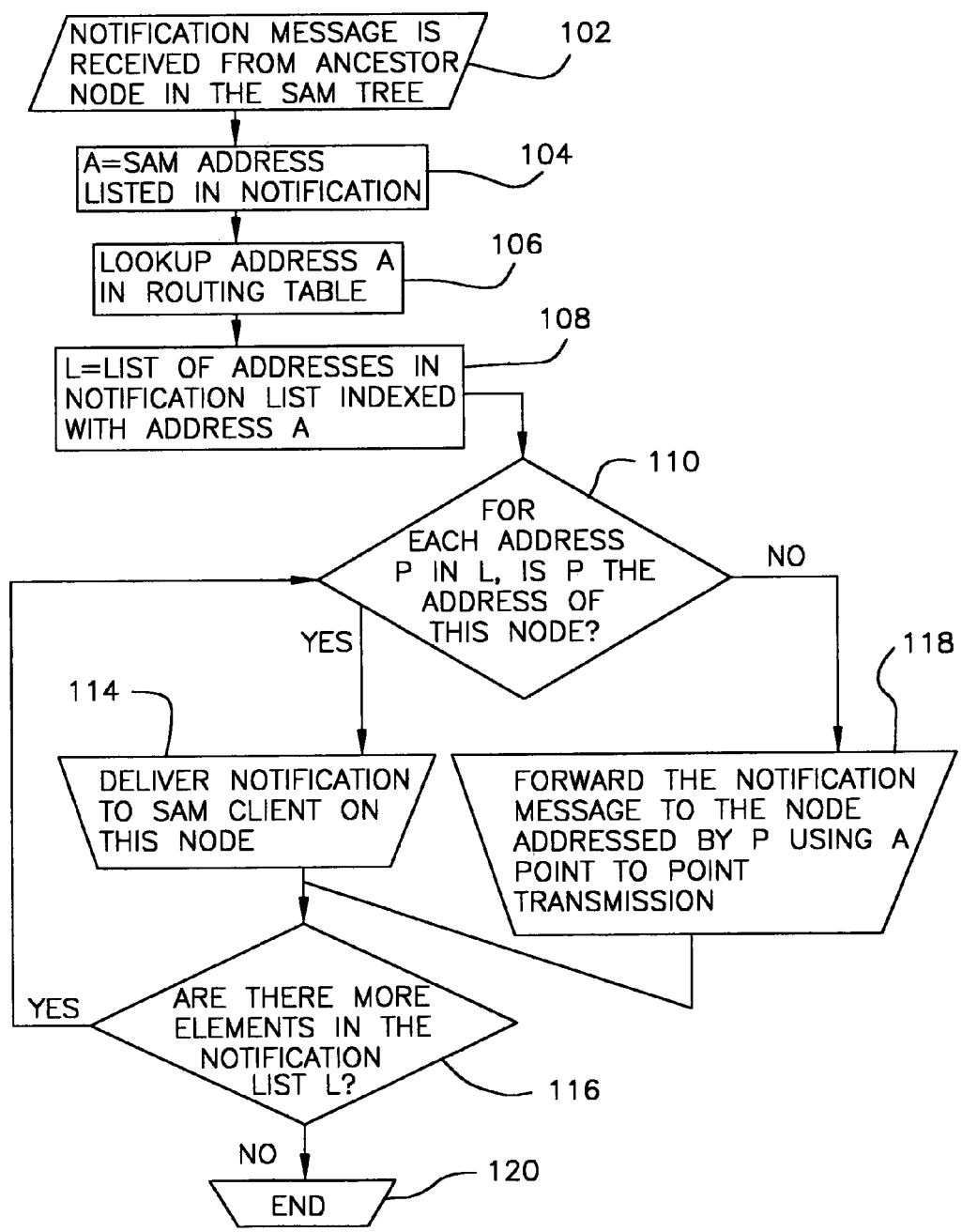
FIG. 12 schematically depicts a procedure for the propagation of a notification.

FIG. 12 illustrates a decision process that each router node may preferably perform in receiving a notification message and routing to the next distribution point. At step 102, a notification message is received from an ancestor node of the SAM tree. At step 104, A is assigned as the SAM address listed in the notification. At step 106, address A is looked up in the routing table. At step 108, L is assigned as the list of addresses in the notification list that are indexed with address A. At step 110, it is queried as to whether, for each address p in L, p is the address of the node in question. If yes, then at step 114, notification is delivered to the SAM client on the node in question. If no, then at step 118 the notification message is forwarded to the node addressed by p by using a point to point transmission. At step 116, it is queried as to whether there are more elements in the notification list L. If yes, then the process returns to step 110, while if no, then the process ends at 120.

As previously mentioned, subscription operations preferably originate at the subscriber nodes and are propagated hop by hop towards the root node of the SAM tree. The actions that each node takes in propagating the subscription message vary according to presence of a fork condition. The fork condition can be detected during the propagation of a subscription message by observing the following condition at any intermediate node:

"A node detects that it is a fork node when it receives a <source,predicate> subscription from another node, and discovers that it had already received a subscription for the same <source,predicate> address, and that the notification list associated with that subscription has only one member."

There are three possible actions taken by a node in propagating a subscribe operation, according to the number of members in the distribution list that are currently associated with a certain predicate at the time that a subscription with that same predicate arrives at the intermediate node:

i. If a subscription is received with a SAM address for which there is not listed in the routing tables, then this is the first time that this node has a received a subscription for that predicate. In this case, a record is made of the subscription in the format <source, predicate, notification_list>, and the same subscription message that was received is propagated to the parent node.

ii. If a subscription is received with a SAM address that is already listed in the node's SAM routing tables, and if there is only one member currently in the notification list for that predicate, then this is a case of the fork node condition. In this case the router node will add the subscriber named in the message to the distribution list of the given predicate. It will then send a substitution message in the format <source,predicate,new_receiver, previous_receiver> to the parent node.

iii. If a subscription is received with a SAM address that is listed in the SAM routing tables of that node, and for which the notification list has two or more members, then this node has already been identified as a fork node In this case, the router node will simply add the node that posted the subscription operation to the distribution list of that SAM address and will not propagate any message.

Figure 13:
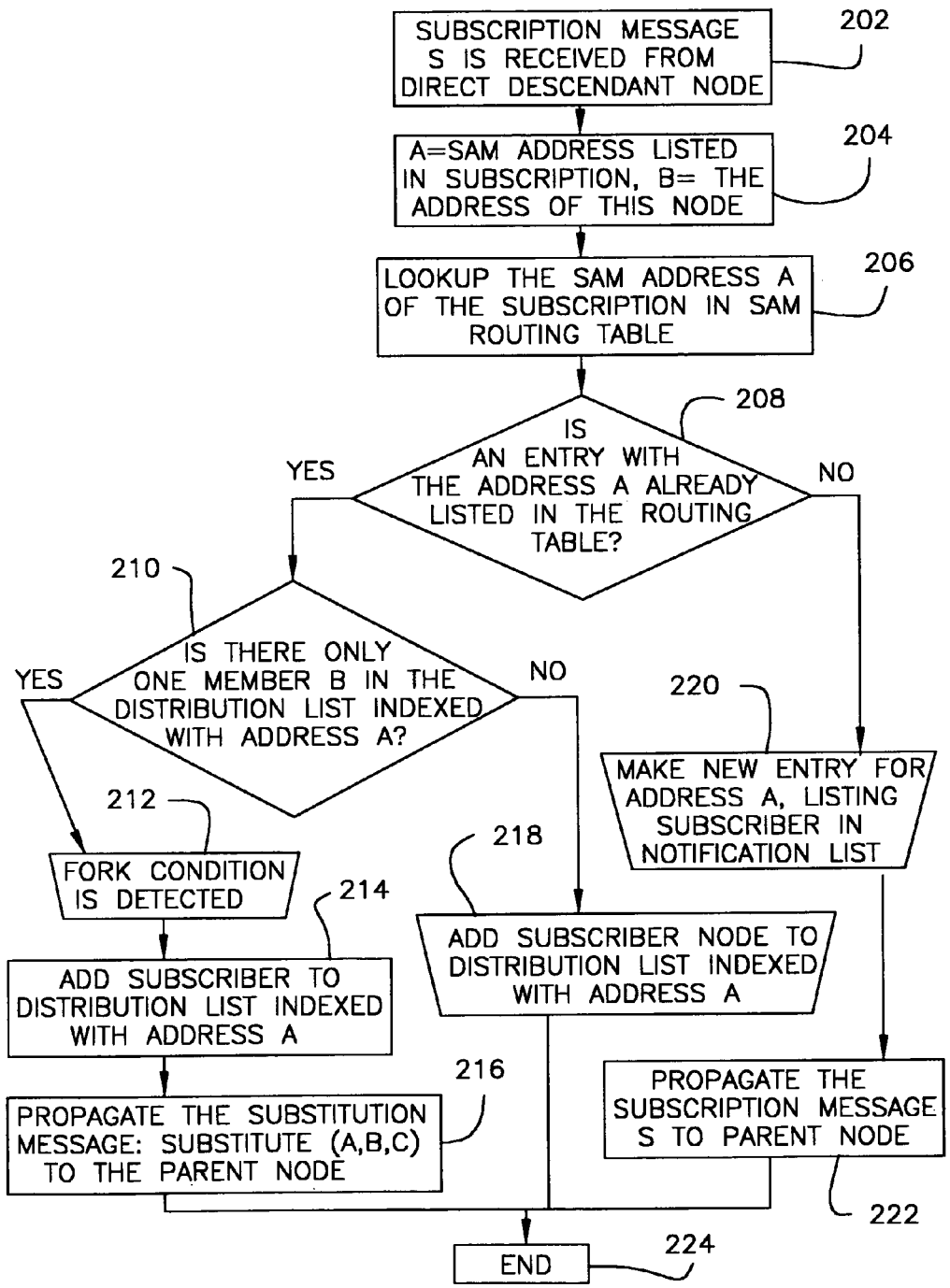
FIG. 13 schematically depicts a procedure for the propagation of a subscription message.

FIG. 13 illustrates a decision process that each SAM router node may preferably perform in receiving a SAM subscription message. Particularly, at step 202, a subscription message S is received from a direct descendant node, or "child node" (i.e., a descendant node that is adjacent). (Other pertinent terminology: an "indirect descendant node" would be a descendant node that is not a child node; a "parent" node would be a direct, or adjacent, ancestor node; and an "indirect ancestor node" would be an ancestor node which is not a parent.) At 204, A is assigned as the address listed in the subscription, and B is assigned as the address of this node. At step 206, the address A of the subscription is looked up in a SAM routing table.

At step 208, it is queried as to whether an entry with the address A is already listed in the routing table. If yes, then at step 210 it is queried as to whether there is only one member C in the distribution list indexed with the address A. If yes to this query, then it is evident that a fork condition is detected (212). Thence, at step 214, the subscriber is added to the distribution list, indexed with address A. At 216, a substitution message is propagated, the message being to substitute (A, B, C) to the parent node, or direct (adjacent) ancestor node. The process then ends at 224.

If the answer to the query at 210 is no, then at 218 the subscriber node is immediately added to the distribution list, indexed with address A, with the process then ending at 224.

If the answer to the query at 208 is no then, at 220, a new entry is made for address A, and the subscriber is listed in the notification list. Thence, at 222, the subscription message S is propagated to the parent (i.e., direct ancestor) node. The process then ends at 224.

In accordance with at least one embodiment of the present invention, an "unsubscribe" operation preferably involves the modification of the notification stream such that nodes which no longer want to receive notifications from a certain subscription are excluded from the notification path. This process can essentially be thought as the reverse process of the subscribe process outlined above.

Upon receiving a request for the deletion of a subscription, the node will preferably delete from the notification list the node that requested the deletion, and than take action according to the following cases:

i. The deletion results in a notification list with two or more members: the node that does the deletion takes no further action, as it continues to function as a fork node in the message stream for at least two nodes.

ii. The deletion results in a notification list with only one member, which is the node processing the deletion iii. The deletion results in a notification list with only one member, which is not the node processing the deletion. In this case the node that is processing the deletion will notice that it is acting as a superfluous hop in the notification stream, and it will propagate a substitution message with the purpose of eliminating that extra hop. In this case a substitution message, propagated upstream, has the format:

<source,predicate, {deleted_member}, {added_member}>;

where the deleted_member is the node processing the deletion and the added_member is the node which was left in the notification list. After receiving the notification that the substitution was propagated all the way to the publishing source, the deleting node will delete the subscription completely and will be excluded from the notification stream.

iv. The deletion results in an empty notification list. In this case the node processing the deletion will propagate a substitution message upstream with the format <source, predicate, {deleted_member}, 0> where 0 indicates that the member is to be deleted.

Figure 14:
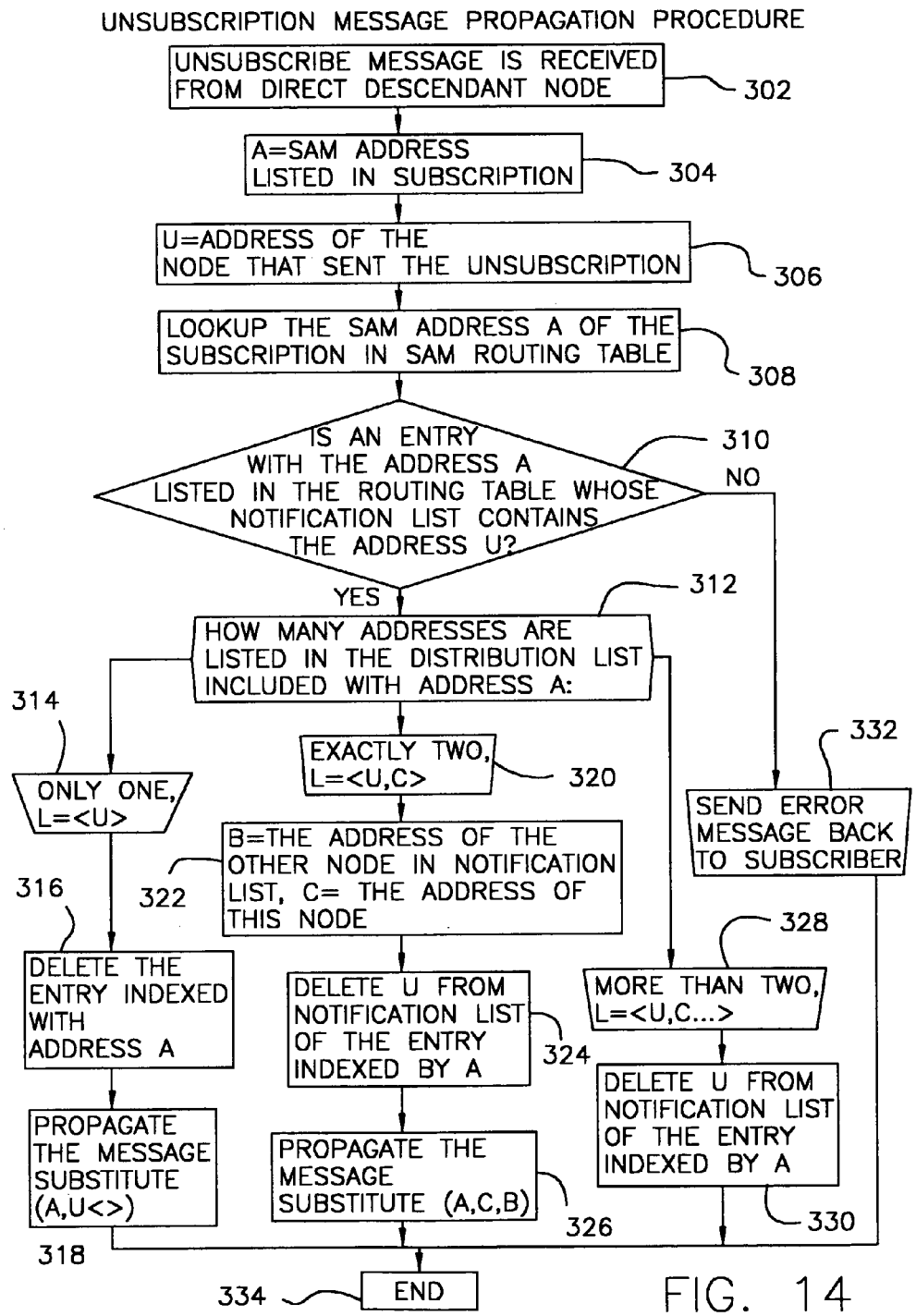
FIG. 14 schematically depicts a procedure for the propagation of an unsubscription message.

The decision process of a node which receives an unsubscribe operation is shown in FIG. 14. Particularly, at step 302, an "unsubscribe" message is received from a direct descendant node (i.e., a child node, or a descendant node that is adjacent). At 304, A is assigned as the SAM address listed in the subscription, while at 306, U is assigned as the address of the node that sent the unsubscription. At 308, the SAM address A of the subscription is looked up in a SAM routing table. At 310, it is queried as to whether there is an entry with the address A listed in the routing table whose notification list contains the address U. If yes, then at 312 it is queried as to how many addresses are listed in a distribution list L indexed with address A. If only one, then at 314, L is necessarily recognized as a set containing solely U, since the logic of the present configuration, in accordance with at least one embodiment of the present invention, will ensure that only U can be in the set. At 316, the entire entry indexed with address A is deleted and, at 318, the message "substitute (A,U,<>) is propagated. The process then ends at 334.

If the answer to the query at 312 is exactly two, then at 320, L is recognized as a set containing U and B. At 322, B is assigned as the address of the other node in the notification list, while C is assigned as the address of this node. At 324, U is deleted from the notification list of the entry indexed by A. At 326, the message "substitute (A,C,B)" is propagated. The process then ends at 334.

If the answer to the query at 312 is more than two then, at 328, L is recognized as a set containing U and B and at least one other element. At 330, U is deleted from the notification list of the entry indexed by A. The process then ends at 334.

If the answer to the query at 310 is no, then at 332 an error message is sent back to the subscriber. The process then ends at 334.

Figure 15:
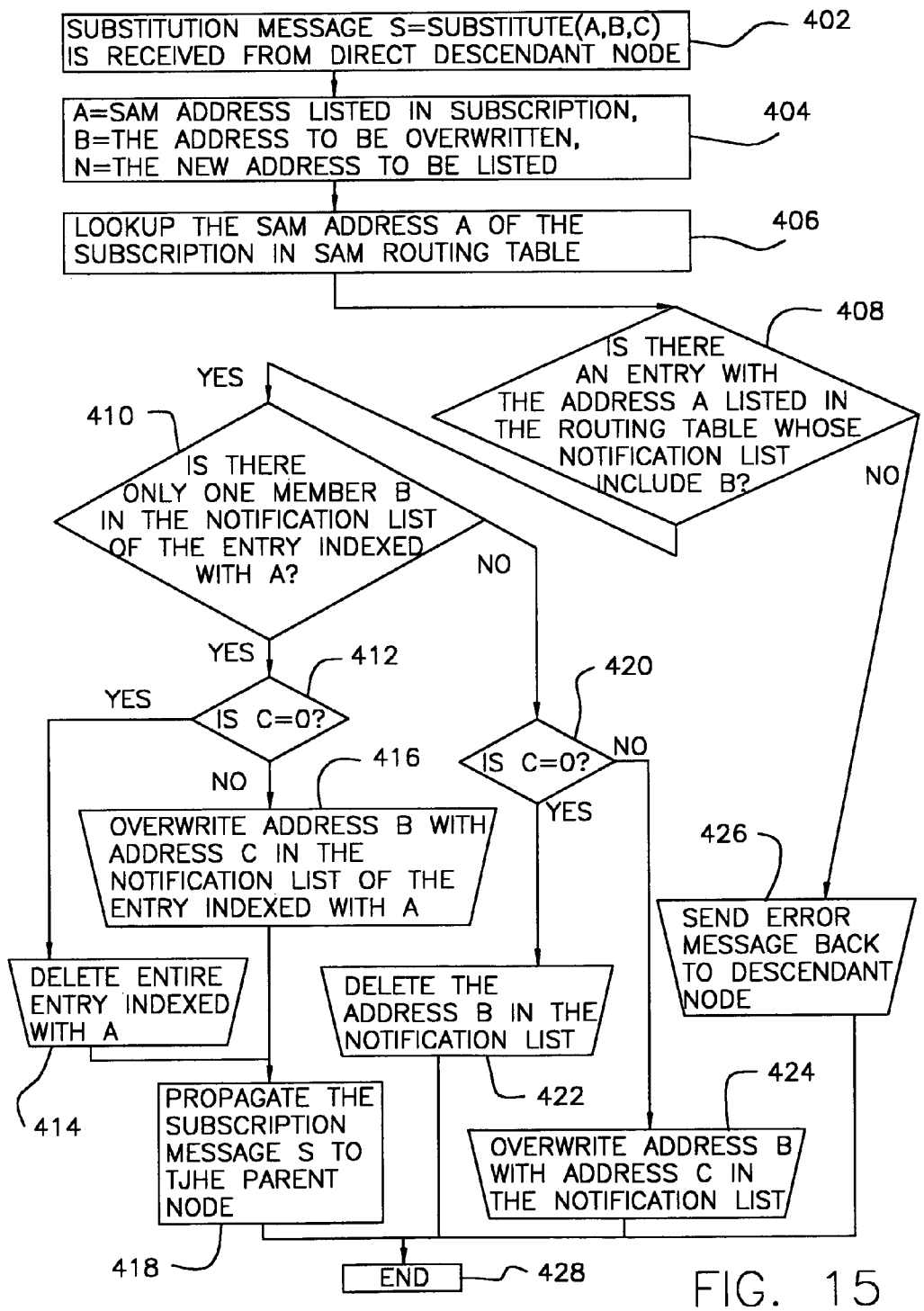
FIG. 15 schematically depicts a procedure for the propagation of a substitution message.

Both the subscribe and unsubscribe operations discussed above utilize a substitution message which is propagated to the ancestor nodes if appropriate. FIG. 15 illustrates a propagation method utilized for substitution messages, which may be utilized in accordance with at least one preferred embodiment of the present invention. Particularly, at 402 the substitution message "S=substitute (A,B,C)" is received from a direct descendant node. At 404, A is assigned as the SAM address listed in the subscription, B is assigned as the address to be overwritten and N is assigned as the new address to be listed. At 406, the SAM address A of the subscription is looked up in the SAM routing table.

At 408, it is queried as to whether there is an entry with the address A listed in the routing table whose notification list includes B. If yes, then at 410 it is queried as to whether there is only one member B in the notification list of the entry indexed with A. If yes, then at 412 it is queried as to whether C is 0. If yes, then at 414 the entire entry indexed with A is deleted. Thence, the subscription message S is propagated to the parent node at 418, and the process ends at 428.

If the answer to the query at 412 is no, then at 416 the address B is overwritten with the address C in the notification list of the entry indexed with A. The process then proceeds to the aforementioned steps 418 and 428.

If the answer to the query at 410 is no, then at 420 it is still queried as to whether C is 0. However, if yes in this instance, then at 422 the address B in the notification list is deleted. The process then ends at 428.

If the answer to the query at 420 is no, then at 424 the address B is overwritten with the address C in the notification list. The process then ends at 428.

If the answer to the query at 408 is no, then at 426 an error message is sent back to the descendant node. The process then ends at 428.

The disclosure now briefly turns to a proof illustrating that the fork nodes are correctly identified by a subscription process in accordance with at least one embodiment of the present invention. It should be appreciated that the protocol described above correctly identifies the fork nodes in a distribution path which originates at the root of a bi-directional tree.

Assume that the SAM tree was built in a process such that the publisher is at the root, and the receivers are the leaf nodes in the tree. Also assume that this tree is bi-directional, i.e. that it uniquely determines the communication path taken by messages from the root to any given subscriber, and vice versa. These paths are unique due to the basic acyclic requirement of the tree data structure. Assume, further, that any notification message that originates at the root node is routed by the intermediate nodes. Consider now that a notification message that originates at the root node needs to be routed to two receivers. Each notification message will be routed along a unique path. These two paths may or may not intersect, as previously described. If there is no intersection, than there will no common path, and no fork node. If on the other hand, there is a common subpath (a sequence of intermediate nodes which is common in both paths), then there will also be a fork node in the network. Now, since the tree is considered to be bi-directional, the paths taken by messages that originate from the subscriber nodes and are directed to the root will be the reverse path of messages that originate from the root. Therefore, if two subscribers which can be reached from the source utilizing a common subpath send messages directed to the source, these messages will be routed along the common subpath. Assuming that messages that originate from the leaves are propagated along each intermediate node using hop by hop propagation, a fork node is necessarily a node of convergence in the path of messages which originate at the leaves and are propagated to the source. Therefore, if intermediate nodes make a record of messages which originate from the leaves and are directed at the root, they will be able to detect that they are a point of convergence of messages that originate at two distinct leave points, and therefore a fork node, or point of divergence for messages which originate at the root.

It is to be understood that the present invention, in accordance with at least one presently preferred embodiment, includes an arrangement for designating one of the nodes as a publisher node, an arrangement for designating at least one other of the nodes as at least one subscriber node, and an arrangement for propagating a transmission from the publisher node to the at least one subscriber node, which together may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of facilitating notification among at least two nodes in a distributed network, said method comprising the steps of:

designating one of the nodes as a publisher node;

designating at least one other of the nodes as at least one subscriber node;

propagating a transmission from the publisher node to the at least one subscriber node via at least one link;

said propagating step comprising propagating only one distinct transmission along any single link;

wherein each node maintains an address of its parent node, and address of each child node, and a distribution list;

providing an address associated with the at least one subscriber node, the address including a predicate field relating to at least one subsource associated with the at least one subscriber node;

wherein said step of propagating a transmission from the publisher node to the at least one subscriber node comprises propagating a transmission, directly to at least one subsource associated with the at least one subscriber node, via checking the distribution list of the subsource node to determine if the predicate in the predicate field is met by any of the node's descendants.

2. The method according to claim 1, wherein:

said step of designating at least one other of the nodes as at least one subscriber node comprises designating solely one subscriber node; and said step of propagating a transmission from the publisher node to the at least one subscriber node comprises propagating only one distinct transmission directly between the publisher node and the one subscriber node.

3. The method according to claim 2, wherein said step of propagating a transmission from the publisher node to said at least one subscriber node comprises propagating only one distinct transmission, along a single link, between the publisher node and the one subscriber node.

4. The method according to claim 1, wherein:
said step of designating at least one other of the nodes as at least one subscriber node comprises designating a plurality of subscriber nodes; and
said step of propagating a transmission from said publisher node to the at least one subscriber node comprises propagating only one distinct transmission to each of the subscriber nodes.

5. The method according to claim 4, wherein said step of propagating a transmission from said publisher node to the at least one subscriber node further comprises propagating only one distinct transmission to an ancestor node common to at least two subscriber nodes.

6. The method according to claim 5, wherein said step of propagating only one distinct transmission to each of said subscriber nodes comprises propagating only one distinct transmission to the ancestor node and thence further propagating only one distinct transmission to each of the at least two subscriber nodes.

7. The method according to claim 1, further comprising the steps of:
designating a subsource that is associated with the at least one subscriber node;
said step of propagating a transmission from the publisher node to the at least one subscriber node comprising propagating a transmission directly to the subsource.

8. An apparatus for facilitating notification among at least two nodes in a distributed network, said apparatus comprising:
an arrangement for designating one of the nodes as a publisher node;
an arrangement for designating at least one other of the nodes as at least one subscriber node;
an arrangement for propagating a transmission from the publisher node to the at least one subscriber node via at least one link;
said propagating arrangement being adapted to propagate only one distinct transmission along any single link;
wherein each node maintains an address of its parent node, and address of each child node, and a distribution list;
an arrangement for providing an address associated with the at least one subscriber node, the address including a predicate field relating to at least one subsource associated with the at least one subscriber node;
wherein said step of propagating a transmission from the publisher node to the at least one subscriber node comprises propagating a transmission, directly to at least one subsource associated with the at least one subscriber node, via checking the distribution list of the subsource node to determine if the predicate in the predicate field is met by any of the node's descendants.

9. The apparatus according to claim 8, wherein:
said arrangement for designating at least one other of the nodes as at least one subscriber node is adapted to designate solely one subscriber node; and
said propagating arrangement is adapted to propagate only one distinct transmission directly between the publisher node and the one subscriber node.

10. The apparatus according to claim 9, wherein said propagating arrangement is adapted to propagate only one distinct transmission, along a single link, between the publisher node and the one subscriber node.

11. The apparatus according to claim 8, wherein:
said arrangement for designating at least one other of the nodes as at least one subscriber node is adapted to designate a plurality of subscriber nodes; and
said propagating arrangement is adapted to propagate only one distinct transmission to each of the subscriber nodes.

12. The apparatus according to claim 11, wherein said propagating arrangement is adapted to propagate only one distinct transmission to an ancestor node common to at least two subscriber nodes.

13. The apparatus according to claim 12, wherein said propagating arrangement is adapted to propagate only one distinct transmission to the ancestor node and thence further propagate only one distinct transmission to each of the at least two subscriber nodes.

14. The method according to claim 8, further comprising the steps of:
an arrangement for designating a subsource that is associated with the at least one subscriber node;
said propagating arrangement being adapted to propagate a transmission directly to the subsource.

15. A program storage device readable by machine, tangibly embodying a program of instructions executable by the machine to perform method steps for facilitating notification among at least two nodes in a distributed network, said method comprising the steps of:
designating one of the nodes as a publisher node;
designating at least one other of the nodes as at least one subscriber node;
propagating a transmission from the publisher node to the at least one subscriber node via at least one link;
said propagating step comprising propagating only one distinct transmission along any single link;
wherein each node maintains an address of its parent node, and address of each child node, and a distribution list;
providing an address associated with the at least one subscriber node, the address including a predicate field relating to at least one subsource associated with the at least one subscriber node:
wherein said step of propagating a transmission from the publisher node to the at least one subscriber node comprises propagating a transmission, directly to at least one subsource associated with the at least one subscriber node, via checking the distribution list of the subsource node to determine if the predicate in the predicate field is met by any of the node's descendants.

* * * * *